L. L. BROWNE.
WASHTRAY.
APPLICATION FILED AUG. 13, 1909.
962,419.
Patented June 28, 1910.
2 SHEETS—SHEET 1.
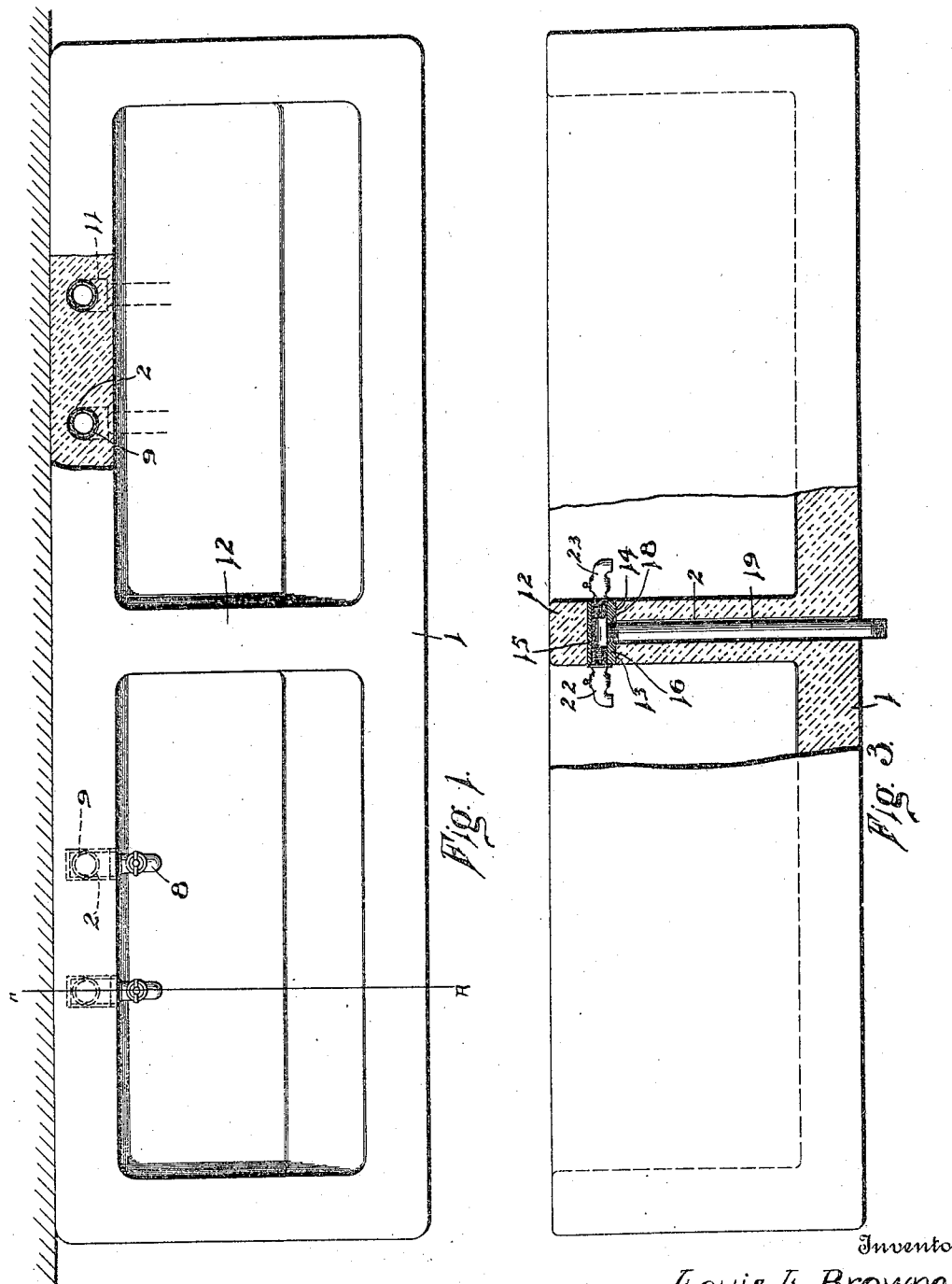

L. L. BROWNE.
WASHTRAY.
APPLICATION FILED AUG. 13, 1909.
962,419.
Patented June 28, 1910.
2 SHEETS—SHEET 2.
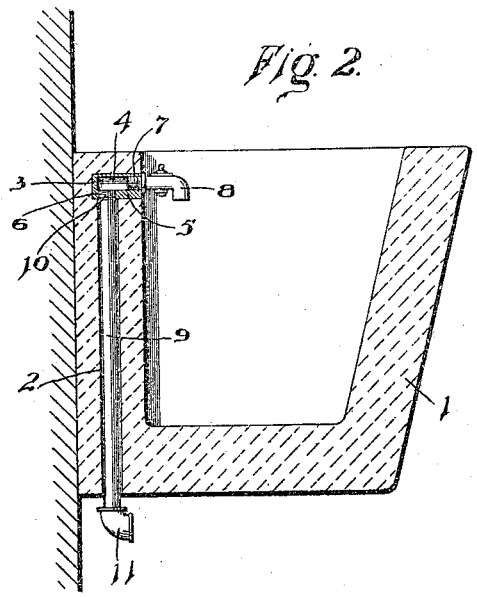
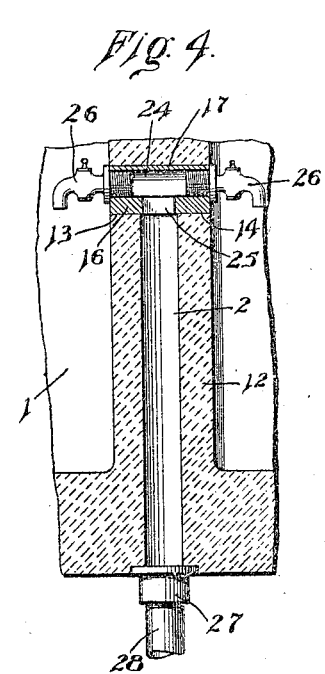
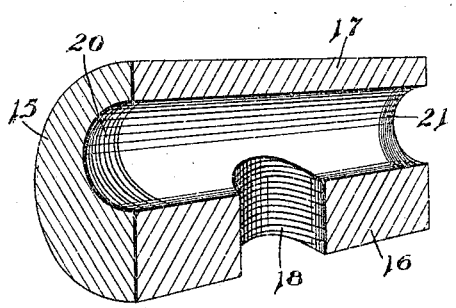
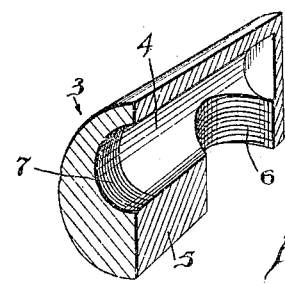
Witnesses
J. S. Freeman
Henry T. Bright
Inventor
Louis L. Browne,
By
Attorney

UNITED STATES PATENT OFFICE.

LOUIS L. BROWNE, OF MATTEAWAN, NEW YORK.

WASHTRAY.

962,419.
Specification of Letters Patent. Patented June 28, 1910.

Application filed August 13, 1909. Serial No. 512,771.

*To all whom it may concern:*

Be it known that I, LOUIS L. BROWNE, a citizen of the United States, residing at Matteawan, in the county of Dutchess, State of New York, have invented certain new and useful Improvements in Washtrays; and I do hereby declare the following to be a full, clear, and exact description of the invention, such as will enable others skilled in the art to which it appertains to make and use the same.

This invention relates to laundry appliances of a type commonly known as wash trays, and more particularly of devices of this character constructed from cement, soapstone and like material.

The object of the invention is to provide a simple constructed device of this character whereby the supply conduits are arranged principally within the walls of the structure so that same may be located close to the wall of the room in which it is located and the conduits in a large measure protected from freezing when the device is located in a room which is heated only at intervals.

A further object of the invention is to construct the cores in the wall of the structure in which the pipe line conduits are located in such relation to said pipe line conduits that the diameter of the core will be in excess of the diameter of the pipe line to allow for the expansion of the latter when water at an extremely high temperature is passing therethrough.

Still another object of the invention is to so construct the connection between the main line conduit and the supplementary pipe line conduit that such connection will be of abnormal strength in order that the main pipe line conduit will be more positively and firmly held in its core.

It is also the aim of the invention to dispense with the use of pipe line conduits disposed in the cores and utilize the core *per se* as a portion of the conduit for carrying water from the supply source.

With the above and other objects in view the invention consists in the details of construction and in the arrangement and combination of parts to be hereinafter more fully described and set forth in the claim.

In describing the invention in detail reference will be had to the accompanying drawings wherein like characters of reference denote like parts in the several views and in which, Figure 1 is a plan view of a wash tray constructed in accordance with the invention and having the pipe line conduit located in the rear vertical wall thereof; Fig. 2, a section on the line *a—a* of Fig. 1; Fig. 3, a vertical longitudinal section of a wash tray having the core and conduit located in the wall thereof which divides same into compartments; Fig. 4, a detail fragmentary section showing the core utilized as a conduit with suitable connections provided at its terminal; Fig. 5, a fragmentary perspective view showing the construction of the T connection employed in Fig. 3; and, Fig. 6, a fragmentary perspective view showing the form of elbow connection employed in Fig. 2.

Referring to Figs. 1, 2 and 6 of the drawings 1 denotes a wash tray constructed of cement or other suitable material and having its rear wall formed with a cylindrical core 2 extending at its lower end through the bottom of the tray and having its upper end disposed at an angle to its vertical portion and opening into the interior of the tray. Mounted in the upper angular portion of the core 2 is an elbow 3 having its inner end closed and provided with an eccentric bore 4 so that the lower wall 5 of the elbow will be much thicker than the upper wall. Said lower wall 5 is provided with a threaded aperture 6 which alines with the vertical portion of the core 2. The eccentric bore 4 is provided at its open end with threads 7 adapted to engage the threaded end of a discharge element 8 which projects into the interior of the tray. A pipe line conduit 9 is mounted to lie in the core 2 and has a transverse diameter sufficiently less than the transverse diameter of the core to permit the expansion of said pipe line conduit when intensely heated without causing any strain on the wall of the tray. The upper end of said pipe line conduit is threaded as at 10 and is adapted for engagement with the threads 6 of the elbow 3 and its lower end is connected to a suitable supply source through the agency of the elbow 11.

Generally two of the pipe line conduits will be arranged side by side as shown in Fig. 1, one for hot water, and one for cold water but as the pipes and their connections are precisely alike the same reference characters are employed to denote like parts in both of the pipes.

In Figs. 3 and 5 the tray is shown constructed with the core and pipe line conduit located in a division wall 12 of the tray, and when thus applied the core 2 is provided at its upper end with angular continuations 13 and 14 opening into the interior of the compartments located on each side of the dividing wall 12. Mounted in the angular extensions 13 and 14 of the core 2 is a connection 15 also provided with an eccentric bore throughout its entire length to render the bottom wall 16 of said connection thicker than the upper wall 17. A threaded aperture 18 passes transversely through the wall 16 of the connection and the pipe line conduit 9 has its upper end threaded and in engagement with the threads of the aperture 18. The terminations of the eccentric bore of the connection 15 are also threaded as at 20 and 21 for interlocking engagement with the discharge elements 22 and 23 respectively which project into the interior of the respective compartments of the tray.

In Fig. 4 is illustrated a structure whereby the utilization of the pipe line conduit is dispensed with; the core 2 serving the functions thereof. To accomplish this result the upper end of the conduit 2 has mounted therein a threaded bushing 24 having an opening 25 through its wall in line with the core 2 and adapted to secure a discharge element 26 disposed into the interior of the tray by threaded engagement. The lower end of the core 2 illustrated in Fig. 4 is provided with a threaded bushing 27 which is adapted to receive the threaded end of a supply pipe 28 whereby the core 2 and the supply pipe are merged into one.

It will be noted that in constructing devices of the character just described out of material adapted to be molded such as cement the cores may be formed simultaneously with the molding of the tray, and when the tray is made of non-moldable material said cores may be easily and readily bored in the wall thereof.

What is claimed is:—

The combination with a structure of the class described, having its wall provided with a vertical bore opening through the bottom thereof and a transverse horizontal bore opening into the interior of same and communicating with the vertical bore, a pipe line connection disposed in said horizontal bore and having a diameter throughout its length equal to the diameter of the bore, whereby said pipe line is held against lateral movement when mounted in said bore, said pipe line being further provided with an eccentric bore to produce an abnormal thickness in its wall and having a transversely disposed threaded aperture through said thickened portion of its wall in alinement with said vertical bore, a second pipe line disposed in said vertical bore having its upper end secured in the threaded aperture of the first named pipe line, said second named pipe line being of less diameter than the vertical bore whereby said pipe line is supported in spaced relation to the surrounding wall of the vertical bore, and a discharge element connected to said first named pipe line.

In testimony whereof, I affix my signature, in presence of two witnesses.

LOUIS L. BROWNE.

Witnesses:
 M. T. MILLER,
 GEO. H. CHANDLEE.